United States Patent [19]

Goddard et al.

[11] Patent Number: 4,605,422
[45] Date of Patent: Aug. 12, 1986

[54] OIL-IN-ALCOHOL MICROEMULSION

[75] Inventors: Errol D. Goddard, Haworth, N.J.; Pak S. Leung, Highland Mills, N.Y.

[73] Assignee: Union Carbide Corporation, Danbury, Conn.

[21] Appl. No.: 815,192

[22] Filed: Dec. 26, 1985

Related U.S. Application Data

[63] Continuation of Ser. No. 595,421, Mar. 30, 1984, abandoned.

[51] Int. Cl.$^4$ .............................................. C10L 1/32
[52] U.S. Cl. ...................................... 44/51; 252/52 R
[58] Field of Search .................. 252/52 R; 44/51, 53, 44/56, 57, 77

[56] References Cited

U.S. PATENT DOCUMENTS

| | | | |
|---|---|---|---|
| 3,346,494 | 10/1967 | Robbins et al. | 44/51 |
| 3,458,294 | 7/1969 | Nixon | 44/51 |
| 3,615,290 | 10/1971 | Nixon | 44/51 |
| 4,337,161 | 6/1982 | Stayner | 252/49.5 |
| 4,371,447 | 2/1983 | Webb | 252/73 |
| 4,451,265 | 5/1984 | Schwab et al. | 44/51 |
| 4,451,267 | 5/1984 | Schwab et al. | 44/51 |

FOREIGN PATENT DOCUMENTS 0962351 1/1964 United Kingdom.

OTHER PUBLICATIONS

Title "Nature", 1943, vol. 152, p. 102.
Title "Faraday Soc.", 1948, vol. 44, pp. 376, 380.
Article by L. Prince J., 1967, vol. 23, p. 165 titled "Colloid and Interface Sci."
I. D. Robb, Editor, Plenum Press (1981), Title "Microemulsions".
Article by Prince, Academic Press Inc. (1977), Title "Microemulsions Theory and Practice", pp. 33–56.
J. Pol Sci., Letters Edition 20, 151–158 (1982).
U.S. Department of Agriculture, Sep. 29, 1982, Title "Microemulsions from Vegetable Oil and Aqueous Alcohol with Trialkylamine Surfactant as Alternative Fuel For Diesel Engines".

Primary Examiner—William R. Dixon, Jr.
Assistant Examiner—Margaret B. Medley
Attorney, Agent, or Firm—Dominic J. Terminello

[57] ABSTRACT

Oil-in-alcohol microemulsions stabilized by at least one emulsifier and useful as lubricating fluids, and the like.

7 Claims, No Drawings

OIL-IN-ALCOHOL MICROEMULSION

This application is a continuation of prior U.S. application Ser. No. 595,421 filed Mar. 30, 1984, now abandoned.

FIELD OF THE INVENTION

The present invention relates to an oil-in-alcohol microemulsion comprising an oil, an alcohol, and at least one emulsifier to stabilize the microemulsion.

BACKGROUND OF THE INVENTION

Certain types of microemulsions are known in the art. For example, oil-in-water microemulsions or water-in-oil microemulsions are employed in the hydraulic fluid field. By way of illustration, U.S. Pat. No. 4,337,161 discloses oil-in-water microemulsions, whereas U.S. Pat. No. 4,371,447 discloses water-in-oil microemulsions for use in hydraulic fluids, and the like. T. P. Hoar and J. H. Schulman (see Nature 152 102, 1943) reported the formation of transparent water-in-oil dispersions containing oil, water, alkali-metal soap and an amphipathic substance such as amyl alcohol. Mutual solubilization of benzene and ethylene glycol by means of amphiphiles (e.g., n-dodecanol and "Aerosol OT") was disclosed by P. A. Winsor (See Transactions of the Faraday Soc., 44 376, 380 1948). It has also been proposed that the depression of interfacial tension between the oil and water phases necessary for formation of microemulsion is brought about by the spontaneous distribution of the alcohol amphiphile between the oil phase and the oil/water interfaces. (See L. Prince, J. of Colloid and Interface Sci. 23, 165 1967).

Microemulsions, sometimes referred to as micellar solutions, soluble oils or swollen micelles, have been discussed in the literature. See, for example, Microemulsions, I. D. Robb, Editor, Plenum Press (1981); Technology of Micellar Solutions by W. C. Tosch, Paper No. SPE 1847-b, Society of Petroleum Engineers of AIME (American Insitute of Mining, Metallurgical and Petroleum Engineers, Inc., 1967); and, *Emulsions and Emulsion Technology* by Prince, pp 125–179 (Marcell Dekker, Inc., 1974). Microemulsions are typically characterized by the prior art as clear, bright and transparent, and these characteristics are desirable for purposes of the present invention. These microemulsion characteristics are due to the fact that the particle (i.e. microdroplet) is typically smaller than the wave-length of visible light. Although clear to the eye, the presence of the microemulsion particles can be detected by instrumental light-scattering techniques. In contrast, macroemulsions are visibly opaque.

The small size of the particles imparts properties to microemulsions that are not found in other fluid systems, particularly macroemulsions which have larger size particles. For example, water-in-oil microemulsions are typically less viscous than water-in-oil macroemulsions formed from the same base oil. This is important in a number of different applications, one of which is lubricating fluids.

The advantages of microemulsions in terms of their improved storage stability, clarity, homogeneity, ease of preparation, and lower viscosity, all as compared to conventional macroemulsions, makes the search for new types of microemulsions particularly attractive.

OBJECT OF THE INVENTION

It is an object of the present invention to produce an oil-in-alcohol microemulsion that is stable during storage, clear, homogeneous, and easy to prepare.

This and other objects will become apparent upon reading the following detailed description of the invention.

SUMMARY OF THE INVENTION

In a principal aspect, the present invention relates to an oil-in-alcohol microemulsion composition having a discontinuous phase and a continuous phase comprising:

(a) alcohol, in an amount sufficient to form a continuous phase in the composition;

(b) alcohol-insoluble oil particles forming a discontinuous phase in said composition, said particles having a particle size of less than about 0.1 micron (preferably less than about 0.05 micron); and, (c) at least one emulsifier, said emulsifier being present in a total amount sufficient to stabilize the composition.

DETAILED DESCRIPTION OF THE INVENTION

The oil useful in the present invention can be any material commonly referred to as an "oil", i.e. any of the numerous substances that are liquid or easily liquifiable by warming and are practically insoluble in the continuous phase of the present composition at its use concentration, and having a vapor pressure of less than 80 mm of Hg at 25° C.

As used herein, the term "continuous" or "outer" phase means the alcohol phase that extends through all parts of the microemulsion in a continuous fashion. This outer phase is to be distinguished from the particulate, discontinuous, inner oil phase. As is well recognized in the technical literature, the maximum packing fraction of uniform spheres would make it possible for the continuous phase to be as small in amount as 26 vol. % based upon the total volume of both phases (which is about the same on a weight basis). Preferably, the continuous phase comprises at least 50 wt. % based upon the total weight of both phases.

As used herein, the term "practically insoluble" means that the amount of oil present exceeds the ordinary solubility limit of the oil in the continuous phase of the composition.

The source of the oil includes such diverse sources as animal, vegetable, mineral or synthetic manufacture. Moreover, the composition of the oil can include such diverse materials as predominantly hydrocarbons, such as mineral and petroleum oils, fatty acid esters, fats, silicone oils, polyalkylene oxides and ester derivatives thereof, or mixtures thereof, and the like. The oil phase can also contain one or more additives used to impart certain properties to the microemulsion, such as biocides, oxidation inhibitors, corrosion inhibitors, and the like.

Based upon the above, the term "oil" is intended to include any organic compound which is practically insoluble in alcohol such as ethylene glycol or propylene glycol, or mixtures thereof, but can be emulsified by the use of emulsifiers, and has a vapor pressure of less than 80 mm. of Hg at 25° C. This limit is important in certain applications, such as lubricants, where volatilization and the flash point of the oil component are considerations. Such oils include non-polar and partially polar, aliphatic and aromatic materials, such as mineral oil, paraffin oil, vegetable oil, naptha oil, methyl-napthalene oil, petroleum base oil, kerosene, mineral spirit, transformer oil, fuel oil, silicone oil, silane esters, synthetic oil, halogenated oils, polypropylene glycols, propylene oxide/ethylene oxide copolymers, propylene oxide/butylene oxide copolymers, ethylene oxide/butylene oxide copolymers, ethylene oxide/propylene oxide/butylene oxide terpolymers, including the alkyl, aryl and alkyl-aryl end-capped derivatives of the above-mentioned polymers and co-polymers as well as sulfated, sulfonated, phosphated and phosphonated oils, higher alcohols and esters thereof, and the like.

The amount of oil present in the microemulsion of the present invention can vary over a wide concentration range, but is preferably between about 0.001 to about 20 (more preferably between about 0.5 and about 5) wt. percent based upon the weight of oil plus continuous phase alcohol of the microemulsion. Within the above-specified preferred limits, the amount of oil used in the microemulsion is dependent upon the end-use required for the microemulsion. Below 0.001 wt. percent oil, the amount of oil would generally be insufficient to be functional, whereas above 20 wt. percent oil, the amount of corresponding emulsifier required would generally be too costly from an economic standpoint.

The emulsifiers useful in the present invention include any of a wide range of anionic surfactants, such as the organo-phosphates, phosphonates, sulfates and sulfonates, as well as salts of fatty acids; cationic surfactants such as organoammonium and phosphonium salts; and non-ionic sufactants such as alcohols, phenols amines, fatty acids and their alkoxylated derivatives, and the like; and amphoterics and zwitterionics such as surface active amino acids, that are well-known in the art. Yet another group of surfactants useful as emulsifiers would include alkyl amino oxides, alkyl phosphonate oxides, and the like. Certain inorganic compounds known to be active as emulsifiers, such as soluble borate and phosphate salts, can be employed as emulsifiers in the present invention. The above surfactants can be used singly or in combination as illustrated in the Example given below, and a combination of at least two surfactants is preferred in order to facilitate microemulsification and reduce or minimize the total surfactant requirement. Also, water in low concentrations is optionally used to enhance the stability of the microemulsions, preferably in an amount of less than 10 weight percent based upon the weight of the microemulsion.

The total emulsifier concentration present in the microemulsion is preferably between about 0.1 times and about 100 times (more preferably between about 2 times and about 10 times) the concentration by weight of oil present in the microemulsion, with the proviso that the total amount of oil plus emulsifier and alcohol not exceed 100 wt percent of the microemulsion. The microemulsion is likely to be unstable if the emulsifier concentration is substantially less than 0.1 times the oil concentration. If the preferred upper limit on surfactant amount is exceeded, it is likely that resulting composition will not be economically feasible from a commercial standpoint.

It is preferred that the emulsifier(s) used in the present invention be readily soluble in the continuous alcohol phase and only marginally soluble in the discontinuous oil phase of the microemulsion.

The alcohol useful as the continuous (or outer) phase in the present invention is preferably a monohydric or polyhydric alcohol corresponding to the formula $R(OH)_a$ wherein "R" is a member selected from the group consisting of primary, secondary and tertiary hydrocarbon radicals, and wherein "a" is an integer having a value of 1 to 6. Such alcohols include methanol, ethanol, propanol, butanol, ethylene glycol, propylene glycol, glycerol, the monoacetate of propylene glycol, the monoethylether of glycerol, the dimethyl ether of glycerol, sorbitol, 1,2-hexanediol, 1,2,6-hexanetriol, alkoxy alkanols (such as methoxyethanol), trimethylolpropane, pentaerythritol, and the like, and mixtures thereof. The alcohol is present in an amount of at least about 26 wt. percent based upon the weight of the microemulsion composition.

Optional additives may be employed in minor amounts of less than 50 wt. percent based on the total weight of the microemulsion composition. Typical optional additives would include, for example, buffers such as alkali metal borates and phosphates, ultraviolet light stabilizers such as hydroquinone, lubricants such as zinc dithiophosphates, antifoams such as polysiloxanes and polyoxyalkylene glycols, perfumes, colorants, antimicrobials such as glutaraldehyde, anti-oxidants such as t-butylphenol, and the like. The minor additives can be soluble in either the oil or alcohol phase of the microemulsion, or both.

The microemulsions of the present invention can be prepared by any known method such as, for example, by mixing the individual components together for a short period of time of between about five minutes and about two hours. Another procedure for making a microemulsion is to heat a mixture of the individual ingredients, while stirring, and then allow the resulting microemulsion to cool to room temperature. The sequence of addition of the oil, alcohol, and emulsifier to form the microemulsion mixture is not critical and the order most convenient may be selected. However, the preferred sequence of addition to facilitate making the microemulsion as rapidly as possible for some microemulsions involves: first, adding the emulsifier(s) to the oil to form an emulsifier-oil mixture and; second, adding alcohol to the emulsifier-oil mixture, with stirring, to form the microemulsion. Procedures for preparing microemulsions are more fully described, for example, in the text "Microemulsion Theory and Practice", Leon M. Prince, Editor (Academic Press, Inc. 1977), the disclosure of which is incorporated herein by reference.

The following example is intended to illustrate, but in no way limit, the present invention.

EXAMPLE 1

A series of microemulsion compositions of this invention was prepared (compositions 1 through 11 in Table I below) by mixing the components of each microemulsion, as outlined in Table I below. In addition, a control example (as identified in Table I below) and several comparative examples (A through C in Table I) were also prepared. Each composition was prepared using a total of between about 20 and about 50 total grams of surfactant, as specified in Table I, plus oil plus alcohol. Each total formulation was made by mixing the components in each of the compositions 1 through 11 for a period of time of between five minutes and two hours, depending upon the time required to form each microemulsion or simple dispersion. The sequence of addition of ingredients was as follows: first the surfactants (i.e. emulsifiers), as specified in Table I, were added to the oil selected. Second, the alcohol was added with mixing to provide the microemulsion or dispersion. A clear appearance was observed visually when looking at each of the individual microemulsion compositions 1 through 9. In contrast, comparative formulations A through C provided milky dispersions when examined visually. The control formulation appeared to be a two-phase system with a clear line of separation between the separate phases of paraffin and methanol.

As can be seen from Table I, the amount of oil, alcohol, and surfactant can be varied substantially while still providing a final product having the clear appearance of a microemulsion. The microemulsion compositions 1 through 11 summarized in Table I were prepared using near minimum amounts of emulsifiers, although higher amounts can be used, if desired, to facilitate preparation of the microemulsions. Specifically, it should be noted that the total amount of emulsifier selected was decreased gradually when the alcohol chosen was varied from methanol to ethanol to isopropanol or propylene glycol to ethylene glycol. The largest amount of surfactant used was 44.2 wt. percent in a single surfactant/methanol/paraffin oil formulation (see Composition 1 in Table I). The least total amount of surfactant used was 3.5 wt. percent in a two-surfactant/ethylene glycol/#2 fuel oil formulation (see Composition 9 in Table I).

When using ethanol or isopropanol as the alcohol in a two-surfactant formulation with paraffin oil as the oil, low levels of total surfactant of 9.1 and 5.0 weight percent, respectively, for ethanol and for isopropanol, were found to be insufficient to form microemulsions. Instead, macroemulsions in the form of coarse dispersions were produced (see Compositions A and B in Table I). In contrast, ethanol in a single-surfactant formulation at a level of 14.2 wt. percent surfactant was found to produce a microemulsion (see Composition 4 in Table I). Likewise propylene glycol in a single-surfactant formulation at a level of 30 wt. percent surfactant was found to produce a microemulsion (see composition 10 in Table I). Likewise, isopropanol in a two-surfactant formulation at a total surfactant level of 15.5 wt. percent was found to produce a microemulsion (see Composition 6 in Table I).

In order to demonstrate the preparation of microemulsions using other oils, Compositions 10 and 11 were made using corn oil and silicone oil, respectively.

TABLE I***

|  | Control | Comp. 1 | Comp. 2 | Comp. A | Comp. 3 | Comp. 4 | Comp. 5 | Comp. B |
|---|---|---|---|---|---|---|---|---|
| Oil Paraffin Oil | 3% | 1.8% | 2.3% | 2.9% | 2.0% | 2.8% | 1.7% | 20% |
| Fuel Oil No. 2 | — | — | — | — | — | — | — | — |
| Corn Oil | — | — | — | — | — | — | — | — |
| Silicone Oil**** | — | — | — | — | — | — | — | — |
| Alcohol | | | | | | | | |
| Methanol | 97% | 54% | 68% | — | — | — | — | — |
| Ethanol | — | — | — | 88% | 74.5% | 83% | 87.7% | — |
| Isopropanol | — | — | — | — | — | — | — | 75% |
| Ethylene Glycol | — | — | — | — | — | — | — | — |
| Water | — | — | — | — | — | — | — | — |
| Surfactant 1* | | | | | | | | |
| "Tergitol NP4" | — | — | 2.3% | 2.9% | 2.5% | — | 3% | 2.5% |
| "Tergitol 15S3" | — | — | — | — | — | 14.2% | — | — |
| "Tergitol 15S5" | — | 44.2% | — | — | — | — | — | — |
| PPG***** | — | — | — | — | — | — | — | — |
| Surfactant 2* | | | | | | | | |
| Decyl alc. | — | — | 27.4% | — | — | — | — | — |
| "Tergitol NP27" | — | — | — | 6.2% | 21% | — | — | — |
| "Tergitol 15S7" | — | — | — | — | — | — | 7.6% | — |
| "Tergitol 25L3" | — | — | — | — | — | — | — | — |
| "Tergitol 25L7" | — | — | — | — | — | — | — | 2.5% |
| "Tergitol 25L20" | — | — | — | — | — | — | — | — |
| Appearance** | 2P | C | C | CD | C | C | C | CD |

|  | Comp. 6 | Comp. C | Comp. D | Comp. 7 | Comp. 8 | Comp. 9 | Comp. 10 | Comp. 11 |
|---|---|---|---|---|---|---|---|---|
| Oil Paraffin Oil | 17.8% | 1.2% | 69.4% | 1.1% | 2.1% | — | — | — |
| Fuel Oil No. 2 | — | — | — | — | — | 1.3% | — | — |
| Corn Oil | — | — | — | — | — | — | 4.4% | — |
| Silicone Oil**** | — | — | — | — | — | — | — | 4.7% |
| Alcohol | | | | | | | | |
| Methanol | — | — | — | — | — | — | — | — |
| Ethanol | — | — | — | — | — | — | 88.8% | 46.5% |
| Isopropanol | 66.7% | — | — | — | — | — | — | — |
| Ethylene Glycol | — | 95% | 3.4% | 87.9% | 83% | 92.8% | — | — |
| Water | — | — | — | — | 4.3% | — | — | — |
| Surfactant 1* | | | | | | | | |
| "Tergitol NP4" | 6.7% | 1.2% | — | — | — | — | — | — |
| "Tergitol 15S3" | — | — | 23.7% | 1.1% | 2.1% | 1.4% | 2.3% | — |
| "Tergitol 15S5" | — | — | — | — | — | — | — | — |
| PPG***** | — | — | — | — | — | — | — | 11.6% |
| Surfactant 2* | | | | | | | | |
| Decyl alc. | — | — | — | — | — | — | — | — |
| "Tergitol NP27" | — | — | — | — | — | — | — | — |
| "Tergitol 15S7" | — | — | — | — | — | — | — | — |
| "Tergitol 25L3" | — | — | — | — | — | — | — | — |
| "Tergitol 25L7" | 8.8% | 2.6% | 3.5% | 9.9% | 8.5% | — | 4.5% | 37.2% |
| "Tergitol 25L20" | — | — | — | — | — | 4.5% | — | — |

TABLE I***-continued

| Appearance** | C | CD | C | C | C | C | C | C |
| --- | --- | --- | --- | --- | --- | --- | --- | --- |

FOOTNOTES - TABLE I
*The above "Tergitol" compounds are identified as follows:
NP4 is a nonylphenol ethoxylate having 4 ethoxy units per molecule average.
NP27 is a nonylphenol ethoxylate having 7 ethoxy units per molecule average.
25L20 is an ethoxylate of linear alcohol having an average number of carbons between 12 and 15 and having 20 ethoxy groups per molecule average.
25L7 is an ethoxylate of linear alcohol having an average number of carbons between 12 and 15 and having 7 ethoxy groups per molecule average.
15S3 is a mixture of ethoxylates of random linear secondary alcohols having 11 to 15 carbon atoms wherein the average number of ethoxy groups per molecule is 3.
15S7 is a mixture of ethoxylates of random linear secondary alcohols having 11 to 15 carbon atoms wherein the average number of ethoxy groups per molecule is 7.
15S5 is a mixture of ethoxylates of random linear secondary alcohols having 11 to 15 carbon atoms wherein the average number of ethoxy groups per molecule is 5.
**2P — Two Phases
C — Clear
CD — Coarse Disperson
***All percents are weight percents based upon the total weight of the composition.
****Silicone oil L-45 having a room temperature viscosity of 50 centistokes.
*****Polypropylene glycol having an average molecular weight of 425.

EXAMPLE 2

In order to demonstrate the preparation of a microemulsion using the procedure given in Example 1, above, but with a different emulsifier, an ionic phosphate surfactant GAFAC RB-400, a product of GAF Corp., was used in the following microemulsion composition:

| Component | Composition 12 (in wt. %) |
| --- | --- |
| ethylene glycol | 96.6 |
| GAFAC RB-400 (surfactant) | 0.5 |
| Transformer oil | 0.1 |
| borate buffer (as $Na_2B_4O_7.5H_2O$) | 1.5 |
| NaOH, 50% aqueous | 1.3 |

The resulting composition formed a clear, stable microemulsion.

EXAMPLE 3

In order to demonstrate the usefulness of a composition of the present invention as a lubricating fluid, the following composition was prepared and tested:

| Component | Composition 13 (in grams) |
| --- | --- |
| Paraffin Oil | 2 |
| Ethylene glycol | 200 |
| "Tergitol NP4" # | 2 |
| "Tergitol 25L7" # | 17 |

\# defined in Example 1

Composition 13 formed a stable, clear microemulsion. It was tested using the FALEX wear test apparatus wherein the load was increased by 250 lbs every 3 minutes into the test. Composition 13 provided lubrication exceeding 20 minutes of test time at a load reaching 1500 lbs. In contrast, a control ethylene glycol formulation caused the apparatus to seize after 11 minutes and a load of up to 1000 lbs causing a steel pin in the apparatus breaking. On the basis of the above, Composition 13 was determined to be a good lubricating fluid.

We claim:

1. An oil-in-alcohol microemulsion composition having a discontinuous phase and a continuous phase comprising;
    (a) alcohol, in an amount sufficient to form a continuous phase in the composition, and
    (b) alcohol-insoluble oil particles having a vapor pressure of less than 80 mm of Hg at 25° C. and forming a discontinuous phase in said composition, said particles having a particle size of less than about 0.1 micron; and,
    (c) at least one emulsifier selected from the group consisting of nonionic surfactants, said emulsifier being present in an amount sufficient to stabilize the composition, wherein said alcohol-insoluble oil particles are present in an amount of between about 0.001 and about 20 wt. percent based on the weight of the composition, and wherein said emulsifier is present in an amount of between about 0.1 times and about 100 times the weight of said alcohol-insoluble oil particles in the composition, and wherein said alcohol is present in an amount of at least about 26 wt. percent based on the weight of the composition, with the proviso that the total weight of the composition not exceed 100 wt. percent, said composition being devoid of anionic surface-active agent.

2. The composition of claim 1 wherein said alcohol is a monohydric or polyhydric alcohol corresponding to the formula $R(OH)_a$ wherein "R" is a member selected from the group consisting of primary, secondary and tertiary hydrocarbon radicals, and wherein "a" is an integer having a value of 1 to 6.

3. The composition of claim 1 wherein said nonionic surfactants are ethoxylates of alcohols and alkyl phenols.

4. The composition of claim 1 wherein said insoluble particles have an average particle size of less than 0.05 micron.

5. The composition of claim 1 which additionally contains at least one minor additive selected from the group consisting of lubricants, buffers, anti-foams, ultraviolet light stabilizers, corrosion inhibitors, perfumes, colorants and antimicrobials in a total amount of less than 50 wt percent based on the wt of the composition.

6. An oil-in-alcohol microemulsion composition having a discontinuous phase and a continuous phase comprising;
    (a) alcohol, in an amount sufficient to form a continuous phase in the composition, and
    (b) alcohol-insoluble oil particles having a vapor pressure less than 80 mm of Hg at 25° C. forming a discontinuous phase in said composition, said particles having a particle size less than about 0.1 micron; and, (c) at least one emulsifier selected from the group consisting of nonionic surfactants, said emulsifier being present in an amount sufficient to stabilize the composition, the amount of alcohol (a) being at least 50 wt. percent of the total weight of alcohol (a) plus alcohol-insoluble oil particles (b) said composition being devoid of anionic surface-active agent.

7. The microemulsion composition of any of claims 1, 2, 3, 4, 5, or 6 wherein said emulsifier is present in an amount of between about 2 and about 10 times the weight of said alcohol-insoluble oil particles in the composition.

* * * * *